(12) United States Patent
Greene

(10) Patent No.: US 11,665,403 B2
(45) Date of Patent: *May 30, 2023

(54) APPARATUS, SYSTEMS AND METHODS FOR SONG PLAY USING A MEDIA DEVICE HAVING A BUFFER

(71) Applicant: DISH Technologies L.L.C., Englewood, CO (US)

(72) Inventor: Gregory Greene, Littleton, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/588,124

(22) Filed: Jan. 28, 2022

(65) Prior Publication Data

US 2022/0150596 A1 May 12, 2022

Related U.S. Application Data

(63) Continuation of application No. 16/595,389, filed on Oct. 7, 2019, now Pat. No. 11,259,094, which is a
(Continued)

(51) Int. Cl.
*G06F 17/00* (2019.01)
*H04N 21/482* (2011.01)
(Continued)

(52) U.S. Cl.
CPC ......... *H04N 21/482* (2013.01); *H04N 21/439* (2013.01); *H04N 21/47217* (2013.01); *H04N 21/8113* (2013.01)

(58) Field of Classification Search
CPC .............. H04N 21/482; H04N 21/439; H04N 21/47217; H04N 21/8113
(Continued)

(56) References Cited

U.S. PATENT DOCUMENTS 6,208,802 B1 *   3/2001  Mori .................... G11B 27/329
                                                        386/253
6,567,609 B2    5/2003  Mori et al.
(Continued)

OTHER PUBLICATIONS

AV/C Digital Interface Command Set General Specification; copyright 1998.
(Continued)

*Primary Examiner* — Paul C McCord
(74) *Attorney, Agent, or Firm* — Perkins Coie LLP

(57) ABSTRACT

Systems and methods control presentation of audio-only content that is broadcast to a media device. An exemplary embodiment receives media content that is currently received in a channel of a broadcasted media content stream; determines whether the currently received channel is a type of channel that provides audio/visual content or a type of channel that provides audio-only content; controls presentation of the received media content using at least one audio/visual content control function in response to determining that the currently received channel is the type of channel that provides audio/visual content; controls presentation of the received media content using at least one audio-only content control function in response to determining that the currently received channel is the type of channel that provides audio-only content, wherein the at least one audio/visual content control function is different from the at least one audio-only content control function.

14 Claims, 3 Drawing Sheets

Related U.S. Application Data continuation of application No. 16/194,997, filed on Nov. 19, 2018, now Pat. No. 10,440,438, which is a continuation of application No. 14/717,083, filed on May 20, 2015, now Pat. No. 10,136,190.

(51) Int. Cl.
*H04N 21/439* (2011.01)
*H04N 21/472* (2011.01)
*H04N 21/81* (2011.01)

(58) Field of Classification Search
USPC .......................................................... 700/94
See application file for complete search history.

(56) References Cited

U.S. PATENT DOCUMENTS

| | | |
|---|---|---|
| 6,588,015 B1 | 7/2003 | Eyer et al. |
| 6,966,064 B1 | 11/2005 | Schneidewend et al. |
| 7,006,422 B2 | 2/2006 | Tanaka et al. |
| 7,032,177 B2 | 4/2006 | Novak et al. |
| 7,062,155 B2 | 6/2006 | Murase et al. |
| 7,797,064 B2 | 9/2010 | Loomis et al. |
| 8,223,975 B2 | 7/2012 | Marko |
| 8,855,796 B2 | 10/2014 | Otsuka et al. |
| 8,880,723 B1 | 11/2014 | Emerson |
| 10,136,190 B2 | 11/2018 | Greene |
| 10,440,438 B2 | 10/2019 | Greene |
| 2002/0154888 A1 | 10/2002 | Allen et al. |
| 2005/0249080 A1 | 11/2005 | Foote et al. |
| 2006/0065709 A1 | 3/2006 | Yamashita |
| 2006/0238611 A1 | 10/2006 | Kenoyer et al. |
| 2006/0263065 A1 | 11/2006 | Akifusa |
| 2007/0025702 A1 | 2/2007 | Khan et al. |
| 2007/0154168 A1 | 7/2007 | Cordray et al. |
| 2007/0209047 A1 | 9/2007 | Hallberg et al. |
| 2008/0022322 A1 | 1/2008 | Grannan et al. |
| 2008/0046936 A1 | 2/2008 | Dam et al. |
| 2008/0172693 A1 | 7/2008 | Ludvig |
| 2008/0320534 A1 | 12/2008 | Wang et al. |
| 2009/0055557 A1* | 2/2009 | Namai ............. H04N 21/44222 710/14 |
| 2009/0285563 A1 | 11/2009 | Endo et al. |
| 2010/0178036 A1 | 7/2010 | Heinmiller et al. |
| 2010/0303448 A1* | 12/2010 | Sariya .................... H04N 5/782 386/297 |
| 2012/0101605 A1 | 4/2012 | Gaalaas |
| 2012/0172087 A1 | 7/2012 | Varela et al. |
| 2012/0200773 A1 | 8/2012 | Davis |
| 2012/0266207 A1 | 10/2012 | Chen et al. |
| 2013/0024880 A1 | 1/2013 | Moloney-egnatios et al. |
| 2013/0090752 A1 | 4/2013 | Jellison, Jr. et al. |
| 2013/0094590 A1 | 4/2013 | Laksono et al. |
| 2013/0309986 A1 | 11/2013 | Cox et al. |
| 2015/0350773 A1 | 12/2015 | Yang et al. |
| 2020/0037037 A1 | 1/2020 | Greene |

OTHER PUBLICATIONS

ID3 draft specification: copyright 2000.
SnaptuneOne (2006). Getting Started with SnaptuneOne—ADS Instant FM Music Edition.

\* cited by examiner

APPARATUS, SYSTEMS AND METHODS FOR SONG PLAY USING A MEDIA DEVICE HAVING A BUFFER

PRIORITY CLAIM

This application is a Continuation of U.S. patent application Ser. No. 16/595,389, filed Oct. 7, 2019, entitled "APPARATUS, SYSTEMS AND METHODS FOR SONG PLAY USING A MEDIA DEVICE HAVING A BUFFER," which is a Continuation of U.S. patent application Ser. No. 16/194,997, filed Nov. 19, 2018, granted as U.S. Pat. No. 10,440,438 on Oct. 8, 2019, and entitled "APPARATUS, SYSTEMS AND METHODS FOR SONG PLAY USING A MEDIA DEVICE HAVING A BUFFER," which is a Continuation of U.S. application Ser. No. 14/717,083, filed May 20, 2015, granted as U.S. Pat. No. 10,136,190 on Nov. 20, 2018, and entitled "APPARATUS, SYSTEMS AND METHODS FOR SONG PLAY USING A MEDIA DEVICE HAVING A BUFFER," the contents of which are incorporated herein by reference in their entirety.

BACKGROUND

Streaming broadcast audio content often includes a series of songs that are presented to the user for their listening enjoyment. The songs may be serially presented one song after another in an uninterrupted manner, and/or may have intervening non-musical segments between individual songs. For example, if the broadcast audio content is provided by a public radio broadcast station, one or more songs may be played with intervening advertisement, commentary from show hosts, a news report, or the like. On the other hand, a pay-for-listening service may present the series of songs in an uninterrupted manner with few, or even no, intervening non-musical segments.

Such broadcast audio content is available from a variety of over the air sources. An example freely accessible broadcast audio content is a music-format radio broadcast station that is broadcasting the series of songs over an amplitude modulation (AM) or a frequency modulated (FM) radio frequency (RF) wireless band, referred to as an over the air or wireless band. Many different types of media devices, often referred to as AM or FM radios, are configured to present (play) the received broadcast audio content as the audio content is received by the media device over the RF airwaves. Typically, there is no possible way for particular songs to be replayed or skipped over since the broadcast audio content is being received and played by the AM/FM radio in real time.

Other sources of broadcast wireless audio content are available. For example, satellite radio provides the broadcast audio content from an overhead satellite. Typically, such satellite-based services are provided to a particular user's media device for a fee (service charge) or as part of a promotion (such as when a new automobile is purchased). Here, specially designed media devices, commonly referred to as satellite radios, are configured to receive satellite signals having the broadcast audio content. Such satellite radios are typically cryptographically secured to prevent free public access to the broadcast audio content. Further, since a user typically pays for receiving the satellite broadcast audio content, the series of songs are often provided with no, or at least very few and/or short duration, intervening non-musical segments.

In some broadcast media environments, both audio/visual content and audio-only content is broadcast to a media device. Such media devices, commonly referred to as set top boxes or receivers, are configured to receive such broadcast audio/visual content, wherein the video portion is presentable to a user on a display (e.g., television/TV, monitor, screen, or other display device) and the audio portions is presented by sound reproducing devices, such as the speakers of a TV and/or a plurality of speakers controlled by a surround sound receiver system or the like. That is, the video content and the associated audio content are synchronously presented to the user. The broadcast audio/visual content may be provided to the media devices using a suitable wire based content delivery system that employs a coaxial cable and/or a fiber optic cable. Alternatively, the broadcast audio/visual content may be received by the media in a suitable wireless medium, such as a FM signal or a satellite signal.

For example, a satellite provider or cable provider may broadcast a large number of different audio/visual content events to the user's media device. Typically, the media device receives many different audio/visual content events at the same time on different channels. Examples of audio/visual content include movies, television programming, sporting events, news casts, documentaries, or the like. Additionally, the satellite provider or cable provider may provide a plurality of audio-only content, similar to the over the air or wireless broadcast audio content provided by AM, FM, or satellite broadcast providers.

Because of the processing time required to receive, process, and format the received video portion of the broadcast audio/visual content, these audio/visual content receiving media devices typically employ a buffer that temporarily stores the received broadcast audio/visual content so that a continuous uninterrupted stream of audio/visual content may be provided to the components of the media content presentation system (such as the TV and/or surround sound system). Such buffers are typically configured to store several minutes, or even longer durations, or the processed audio/visual content.

The user may operate the media device provisioned with such a buffer to perform various presentation operations, commonly referred to as "trick" functions. An example trick function is referred to as a "pause" function wherein presentation of the video content is paused. That is, presentation of the stream of video content (serial presentation of a series of video frames, wherein each video frame is presented for a brief predefined duration of time) is halted when a pause operation is initiated. During the pause operation, a currently presented video frame or a selected video frame is shown on the display of the TV for an indefinite duration. When the user ends the pause operation, presentation of the video resumes. During the pause operation, the corresponding audio portion is also halted such that when the pause operation is ended, presentation of the audio content resumes in synchronism with presentation of the video content.

Another trick function is the "rewind" function. With a rewind function, previously presented video frames are re-accessed from the buffer and are presented in a backward manner on the display of the TV. That is, the user sees a backward or reverse presentation of the video content. During such rewind operations, the audio portion is halted such that when the video rewind operation ends, presentation of the audio content resumes in synchronism with presentation of the video content.

The speed at which the rewind presentation is made may vary based on the configuration of the media device and/or selection by the user. For example, a slow motion rewind operation may be selected by the user wherein the backward presentation of the retrieved video frames presents a slow speed presentation (slower than normal speed presentation) of the video content. Alternatively, a fast rewind operation may be selected by the user wherein the backward presentation of the retrieved video frames is a fast speed presentation (faster than normal speed presentation) of the video content.

Yet another video presentation alternative is a "jump back" function, wherein previously presented video content is again presented beginning at some predefined duration back in time. Here, a previously presented video frame is accessed from the buffer. The accessed video frame is selected based upon some predefined duration, such as one or more minutes, several seconds, or the like. Thus, when this jump back operation is initiated by the user, presentation of the video content is simply repeated at a point identified by the predefined duration. During the jump back operation, presentation of the audio content also jumps back by a corresponding duration so as to resume in synchronism with presentation of the video content.

In the event that some duration of the processed audio/visual content which proceeds the currently presented audio/visual content has been stored in the buffer, one or more forward presentation operations may be available to the user. For example, if the user has previously paused presentation of the audio/visual content by five minutes, then approximately five minutes of processed audio/visual content that has not yet been presented will be stored in the buffer. Alternatively, or additionally, a rewind function may have been previously performed such that a corresponding duration of previously presented audio/visual content is stored in the buffer. Accordingly, the user may fast forward through the audio/visual content so that a higher speed presentation of the video content is provided. During the fast forward presentation operation, the audio portion is halted such that when the fast forward operation is ended, presentation of the audio content also resumes in synchronism with presentation of the video content.

Another forward presentation operation is the "jump forward" operation wherein the a portion of the video content is skipped over (not presented) by some predefined duration. Here, a stored video frame that is ahead of a currently presented video frame is accessed from the buffer. Presentation then continues beginning with the accessed video frame such that a portion of the video content between the currently presented frame and the accessed video frame is simply not presented. The accessed video frame is selected based upon some predefined duration, such as one or more minutes, several seconds, or the like. During the jump forward operation, presentation of the audio content is also advanced by the corresponding duration so as to resume in synchronism with presentation of the video content.

The above-described video presentation trick functions provide satisfactory user-selectable functions for presentation of audio/visual content because the user performing these various operations is able to immediately view the video content. That is, the user receives immediate visual feedback when they initiate one or more of the above described audio/visual content trick functions. For example, the user may want to fast forward through a commercial, advertisement, or the like using the fast forward function, the jump forward function, or a combination thereof. The user immediately understands if they have advanced presentation of the audio/visual content sufficiently far enough so that they may avoid presentation of the commercial. Once the commercial has been passed over, the user may operate their media device to resume presentation of the video content.

However, the above-described trick functions for rewinding back through, or moving forward though, broadcast audio-only content does not work in a satisfactory manner. For example, the user may wish to again listen to a currently presented song or a previously presented portion of that song. If the user initiates an audio/visual content rewind operation, presentation of the audio content is typically halted. Thus, the user is not able to perceive how far back in time that the audio content has been rewound. As another example, if the user initiates an audio/visual content jump back operation, it is likely that the currently presented song will not be re-presented at its beginning. It is even possible that replay of the audio content will begin before the conclusion of the previously presented song.

Similarly, the user may wish to no longer listen to a currently presented song, and advance to the next song in the broadcast audio-only content. If the user initiates an audio/visual content fast forward operation, presentation of the audio content is typically halted. Thus, the user is not able to perceive how far the audio content has been advanced. As another example, the user may initiate a jump forward operation. Here, it is likely that a beginning portion of the next song will be missed since the amount of the advancement in presentation of the audio content is based on the predefined duration of the jump forward operation. Or, multiple audio/visual content jump forward operations may be required to get past the currently presented song and into the next song in the broadcast audio content.

Accordingly, there is a need in the arts to provide audio-only content trick functions in media devices that are configured to receive broadcast audio/visual content and audio-only content. That is, when the media device is presenting audio-only content, the media device enables the user to advance past a currently presented song to the beginning of a next song, to replay a currently presented song from its beginning, and/or to access a previously presented song from its beginning.

SUMMARY

Systems and methods of controlling presentation of audio-only content are disclosed. An exemplary embodiment receives media content that is currently received in a channel of a broadcasted media content stream; determines whether the currently received channel is a type of channel that provides audio/visual content or a type of channel that provides audio-only content; controls presentation of the received media content using at least one audio/visual content control function in response to determining that the currently received channel is the type of channel that provides audio/visual content; controls presentation of the received media content using at least one audio-only content control function in response to determining that the currently received channel is the type of channel that provides audio-only content, wherein the at least one audio/visual content control function is different from the at least one audio-only content control function.

BRIEF DESCRIPTION OF THE DRAWINGS

Preferred and alternative embodiments are described in detail below with reference to the following drawings.

DETAILED DESCRIPTION

Figure 1:
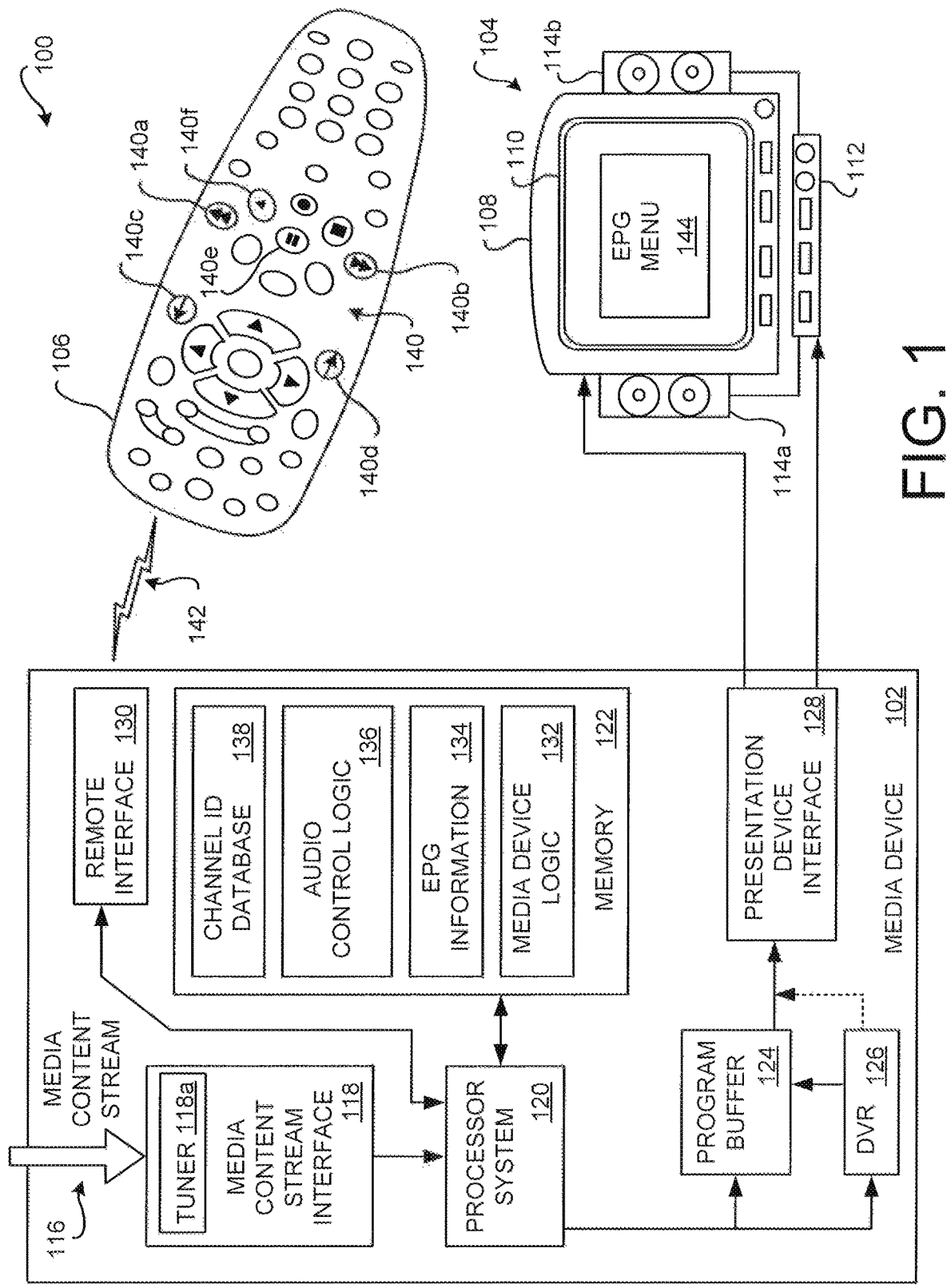
FIG. 1 is a block diagram of an embodiment of the audio content presentation system.

FIG. 1 is a block diagram of an embodiment of the audio content presentation system 100. The example audio content presentation system 100 is provisioned in an example media device 102 that is configured to present audio/visual content and audio-only content using a media content presentation system 104. A remote control 106 is included that is configured to control operation of the media device 102, and optionally, to control one or more of the components of the media content presentation system 104.

Embodiments of the audio content presentation system 100 are configured to determine whether a currently received channel of media content is a type of channel that provides audio/visual content or a type of channel that provides audio-only content. If the type of channel provides audio/visual content, presentation of the received media content is controlled using at least one audio/visual content control function. Alternatively, if the type of channel provides audio-only content, presentation of the received media content is controlled using at least one audio-only content control function.

In practice, embodiments of the audio content presentation system 100 may be configured to perform a "skip track forward" operation when audio-only content is being received in an audio-only content type of channel. The skip track forward operation advances forward, or skips forward, from presentation of a currently presented song to a presentation of a next song in a stream of received broadcasted audio-only content type of channel. The skip track forward operation is performed in response to a user selection made via the remote control 106. The skip track forward operation may be initiated by the user at any point in the presentation of the current song that is being played from the broadcasted audio-only content.

Further, embodiments may be configured to perform a "skip track backward" operation. The skip track backward operation rewinds, or skips backward, from presentation of a currently presented song to a presentation of a previously presented song (starting at its beginning). The skip track backward operation occurs in response to a user selection made via the remote control 106.

Embodiments may be further configured to perform a "return to song beginning" operation. The return to song beginning operation jumps backward to the beginning of the currently presented song.

The exemplary media device 102 is communicatively coupled to the media content presentation system 104 that includes a visual display device 108, such as a television (hereafter, generically a TV) with a display 110 that presents the video content, if present, to the user. The media content presentation system 104 further includes an audio presentation device (APD) 112, such as a surround sound receiver controlling one or more audio reproduction devices (hereafter, generically, speakers 114a, 114b) that are emitting sound corresponding to the audio portion of the presented media content. Other types of output devices may also be coupled to the media device 102, including those providing any sort of stimuli sensible by a human being, such as temperature, vibration and the like. The video portion of the presented media content is displayed on the display 110 and the audio portion of the media content is reproduced as sounds by one or more speakers 114a, 114b. In some embodiments, the media device 102 and one or more of the components of the media content presentation system 104 may be integrated into a single electronic device.

Embodiments of the audio content presentation system 100 may be implemented in other media devices, such as, but not limited to, stereos, surround-sound receivers, radios, televisions (TVs), digital video disc (DVD) players, digital video recorders (DVRs), cellular phones equipped with video functionality, personal device assistants (PDAs), game playing devices, or personal computers (PCs) that are configured to present a video-based media content event that is received in a media content stream 116.

The non-limiting exemplary media device 102 comprises a media content stream interface 118, a processor system 120, a memory 122, a program buffer 124, an optional digital video recorder (DVR) 126, a presentation device interface 128, and a remote interface 130. The memory 122 comprises portions for storing the media device logic 132, the electronic program guide (EPG) information 134, the audio control logic 136, and a channel identifier (ID) database 138. In some embodiments, the media device logic 132 and the audio control logic 136 may be integrated together, and/or may be integrated with other logic. In other embodiments, some or all of these memory and other data manipulation functions may be provided by and using remote server or other electronic devices suitably connected via the Internet or otherwise to a client device. Other media devices may include some, or may omit some, of the above-described media processing components. Further, additional components not described herein may be included in alternative embodiments.

The functionality of the media device 102, here a set top box, is now broadly described. A media content provider provides media content that is received in one or more multiple media content streams 116. Generally, two different types of media content are communicated in the broadcast-format media content streams 116, audio/visual content and audio-only content.

The first type of media content is the audio/visual content. The audio/visual content includes a video content portion and an audio content portion. Typically, the audio/visual content further includes a stream of metadata (control and/or supplemental information) and an optional stream of closed captioning information (text corresponding to the audio dialogue and/or audio commentary of the audio/visual content). Non-limiting examples of this first type of media content are movies, television programming, sporting events, news casts, documentaries, or the like. The video content comprises a series of serially presented video frames when, when presented on the display 110 for a short duration, are perceived by a viewing user as a motion picture. Typically, audio/visual content presents a thematically-based story. The audio content may include dialogue spoken by actors shown in the video content, commentary by other individuals, sound effects, and/or music. The associated audio content, and the optional closed captioning content if selected by the user for presentation, are synchronously presented with the video content.

The second type of media content is defined herein as audio-only content. The audio-only content includes a series of serially presented songs. When a currently playing song has concluded, the next song in the stream of audio-only content is then presented. The series of songs are often provided with no, or at least very few and/or short duration, intervening non-musical segments. Preferably, each newly presented song is performed by a different artist. In contrast to audio/visual content, presentation of the songs in the audio-only content is not thematic based. That is, presentation of the series of songs does not present a story line.

Preferably, visual content is absent from the stream of audio-only content. However, some audio-only content may include limited visual content, such as textual information about a currently presented song (such as the artist's name, the song title, the album name, the song label, the song recording date, etc.) and/or one or more still images (such as a photograph of the song artist or some object that is a subject of the song) and/or a short video relating to the song. In contrast to audio/visual content, presentation of the any associated video and/or still image content included in the audio-only content is not thematic based. That is, presentation of the video and/or still images during the series of songs does not present a story line.

In an example embodiment, multiple media content streams 116 with audio/visual content and/or audio-only content may be multiplexed together in one or more transport channels. The transport channels with the media content streams 116 are communicated to the media device 102 from a media system sourced from a remote head end facility (not shown) operated by the media content provider. Non-limiting examples of such media systems include satellite systems, cable system, and the Internet. For example, if the media content provider provides programming via a satellite-based communication system, the media device 102 is configured to receive one or more broadcasted satellite signals detected by an antenna (not shown). Alternatively, or additionally, the media content stream 116 can be received from one or more different sources, such as, but not limited to, a cable system, a radio frequency (RF) communication system, or the Internet. The media content stream 116 may be alternatively received from an external device, such as a digital video disk (DVD) player, compact disk (CD) player, a flash memory medium, or another suitable memory medium device that stores media content.

The one or more media content streams 116 are received by the media content stream interface 118. In a broadcast environment, one or more tuners 118a in the media content stream interface 118 selectively tune to one of the media content streams 116 in accordance with instructions received from the processor system 120. The processor system 120, executing the media device logic 132 and based upon a request for a media content event of interest specified by a user (not shown), parses out media content associated with the specified media content event of interest.

The media content event of interest, which may be an individual audio/visual content event or an individual audio-only content event (i.e., a song), is then assembled into a stream of video and/or audio information which may be stored by the program buffer 124. The program buffer 124 temporarily stores the received processed media content events. Such buffers are typically configured to store several minutes, or even longer durations, of the processed audio/visual content. The buffered (temporarily stored) media content can then be communicated out from the program buffer 124 as a continuous uninterrupted stream of media content to the components of the media content presentation system 104, such as the visual display device 108 and/or the audio presentation device 112, via the presentation device interface 128. Alternatively, or additionally, the parsed out media content may be saved into the DVR 126 for later presentation. The DVR 126 may be directly provided in, locally connected to, or remotely connected to, the media device 102. In alternative embodiments, the media content streams 116 may stored for later decompression, processing and/or decryption.

From time to time, information populating the EPG information 134 portion of the memory 122 is communicated to the media device 102, via the media content stream 116 or via another suitable media. The EPG information 134 stores the information pertaining to the scheduled programming of media content events. The information may include, but is not limited to, a scheduled presentation start and/or end time, a program channel, and descriptive information. The media content event's descriptive information may include the title of the media content event, names of performers or actors, date of creation, and a summary describing the nature of the media content event. Any suitable information may be included in the supplemental information. Upon receipt of a command from the user requesting presentation of an EPG menu, the information in the EPG information 134 is retrieved, formatted, and then presented on the display 110 as an EPG menu 144.

The exemplary media device 102 is configured to receive commands from a user via a remote control 106. The remote control 106 includes one or more controllers 140 disposed on the surface of the remote control 106. The user, by actuating one or more of the controllers 140, causes the remote control 106 to generate and transmit commands, via a wireless signal 142, to the media device 102. Preferably, each individual one of the controllers 140 has a specific predefined function that causes a specific operation by the media device 102 and/or by components of the media content presentation system 104. The commands communicated from the remote control 106 then control the media device 102 and/or control components of the media content presentation system 104. The wireless signal 142 may be an infrared (IR) signal or a radio frequency (RF) signal that is detectable by the remote interface 130.

The processes performed by the media device 102 relating to the processing of the received media content stream 116 and communication of a presentable media content event to the components of the media content presentation system 104 are generally implemented by the processor system 120 while executing the media device logic 132. Thus, the media device 102 may perform a variety of functions related to the processing and presentation of one or more media content events received in the media content stream 116.

Typically, the received media content stream 116 includes at least one channel of media content that is provided by a single media content provider. In a satellite-based or cable-based media content delivery system, each media content stream 116 includes multiple channels of media content. A single channel provides, over a period of time, a series of media content events. In practice, an identifier of a particular channel is associated with a particular media content provider.

Channels are uniquely identified from other available channels of media content using a predefined numeral and/or a predefined alpha-numeric identifier. The channel identifiers are preferably indicated on the presented EPG menu 144. When a user selects a particular audio/visual content event of interest using the EPG menu 144, the media device 102 identifies the audio/visual content event, based in part, upon the channel identifier that identifies the channel that is providing the selected audio/visual content event of interest.

In situations where a particular channel is providing audio-only content, the audio-only content channel may be associated with a particular type of music, such as rock and roll, country, bluegrass, jazz, or the like. If a user is interested in listening to a particular type of music, the user may select a particular channel having the type of music of interest by specifying that particular channel's unique identifier. Once the audio-only content channel has been selected, the series of songs currently being broadcast are presented to the user as the series of songs are being received at the media device 102 in the selected audio-only content stream.

Figure 2:
FIG. 2 conceptually illustrates an example EPG menu that indicates a plurality of channels of audio/visual content and a plurality of channels of audio-only content.

FIG. 2 conceptually illustrates an example EPG menu 144 that indicates a plurality of channels of audio/visual content and a plurality of channels of audio-only content. The example EPG menu 144 is presented on a display device, such as the display 110, to assist a user to select a particular media content event or channel of interest of interest. The EPG menu 144 is a type of a user interface that presents a menu, or a series of menus, with a combination of text and symbols to represent viewing choices that may be selected by the user.

In the example EPG menu 144, programming channels are identified by a suitable identifier, such as the name of the programming station or the like. Here, the seven channels are identified as stations A-G. The media device 102 is configured to present programming that is provided by many different programming channels, sometime even several hundreds of different programming channels. Accordingly, the user is able to navigate about the current EPG menu 144 so as to be able to access media content provided on one or more channels of interest.

Typically, the EPG menu 144 has the look and feel of a table with program information describing available media content events and/or channels that are currently being broadcast to the media device 102 in the available indicated channels. The information shown on the EPG menu 144 may include the title of available audio/visual content type media content events, along with the scheduled time and date of presentation of the audio/visual media content event. A brief description of the audio/visual media content events may also be provided on the EPG menu 144. The EPG menu 144 typically indicates the "channel" of the available media content event. The channel identifies the originating source of the audio/visual media content event, such as a television studio, a premium movie provider, a national program provider, etc.

Here, the simplified EPG menu 144 illustrates four channels of audio/visual content and three channels of audio-only content. The three audio/visual content channels are identified as "Station A", "Station B", "Station C" and "Station D" in the example EPG menu 144. The three audio-only content channels are identified as "Station E", "Station F" and as "Station G" in the example EPG menu 144. In other embodiments, the EPG menu 144 may alternatively, or additionally, identify available channels using their unique numeral identifiers.

Individual audio/visual media content events that are currently available are shown adjacent to the programming channel on which they are available. For example, an audio/visual media content event with the title "Program A1" is currently available on the programming channel identified as "Station A" (and so on). Thus, the user is able to appreciate which audio/visual media content events are currently available, or are available in the future, for viewing.

If the channel is an audio-only content type channel, the particular type of music that the channel provides may be indicated on the EPG menu 144. Because individual songs are relatively short, it is typically not practical to identify individual songs on the EPG menu 144 as they are being broadcast and/or when are scheduled for broadcast. Rather, the particular type of music provided by that channel is indicated on the EPG menu 144. For example, "Station E" provides jazz type music. Thus, the series of broadcast songs available from the channel "Station E" are appreciated to be jazz type songs. Similarly, "Station F" provides country type music and "Station G" provides rock and roll type music. Any suitable descriptor may be used to identify and/or determine characteristics of songs available on an audio-only content channel. Further, the descriptor may be revised as needed if the characteristics of the songs changes over time.

The EPG menu 144 is interactive with the user. The user, via their remote control 106 that is in communication with a media device 102 is able to "scroll" or "navigate" about the EPG menu 144 to select a media content event of interest and/or to select a particular channel of interest (thereby being presented the media content that is being currently broadcast on that selected channel). When the user highlights the portion of the EPG menu 144 corresponding to a particular audio/visual media content event of interest and/or a particular channel of interest, the user may actuate one or more controllers 140 of the remote control 106 to cause the media device 102 to perform a function relative to the selected media content event or channel of interest.

For example, if particular audio/visual media content event of interest is scheduled to begin, or is currently available, the user may select the audio/visual media content event of interest for immediate presentation on the display 110 by navigating to the region of the EPG menu 144 that indicates the media content event. One of the controllers 140 on the remote control 106 is then actuated by the user to select that particular audio/visual media content event.

In response to the user selection, the tuner 118a tunes itself to receive the media content stream 116 having the channel associated with the selected audio/visual media content event. The received media content in the tuned-to channel is then processed and stored into the program buffer 124. The buffered audio/visual media content event is then streamed out from the program buffer 124 to the components of the media content presentation system 104 in a continuous and uninterrupted manner. Alternatively, or additionally, the user may have the media device record and store the audio/visual media content event in a memory, such as the example DVR 126, such that the user may later view the selected audio/visual media content event at a more convenient time.

In the event that the user selects one of the audio-only content channels, the tuner 118a tunes itself to receive the media content stream 116 having the audio-only content. The received songs of the audio-only content in the tuned-to audio-only content channel is then processed and stored into the program buffer 124. The series of individual songs are then serially streamed out from the program buffer 124 to the components of the media content presentation system 104 in a continuous and uninterrupted manner.

When an audio/visual media content event is being presented, various trick function operations to control presentation of the audio/visual content are available to the user, typically via commands initiated through user actuation of one or more of the controllers 140 on the remote control 106. For example, a fast forward controller 140a (indicated by right pointing double arrows) is intuitively understood by the user to correspond to a fast forward operation wherein speed of presentation of the video portion is advanced by some predefined speed increment if actuated by the user. Subsequent actuation of that fast forward controller 140a, or actuation of another one of the controllers 140, ends the fast forward operation so that presentation of the video portion resumes at its normal presentation speed. Similarly, the fast rewind controller 140*b* (indicated by left pointing double arrows) is intuitively understood by the user to correspond to a fast rewind operation wherein speed of presentation of the video portion is reversed by some predefined speed increment if actuated by the user. Subsequent actuation of that fast rewind controller 140*b*, or actuation of another one of the controllers 140, ends the fast rewind operation so that presentation of the video portion resumes at its normal presentation speed. Here, buffered video content is accessed from the program buffer 124 at a rate and direction corresponding to the user selected fast forward or fast rewind operation. Some embodiments may provide for adjustable fast forward or fast rewind speeds using one or more of the controllers 140.

During the fast forward and/or fast rewind operations, presentation of the audio content is halted (muted). That is, because the audio content if presented at the fast forward or fast rewind speeds would be unintelligible to the user, the audio is simply muted during those operations. Accordingly, if the user is listening to songs presented by an audio-only content channel, the fast forward controller 140*a* will not be particularly effective for the user to get through to the end of the currently presented song and advance to the beginning of the next song since there is no audio output during this fast forward operation (or, if there is audio output during the fast forward operation, the audio output is generally unintelligible to the user). Similarly, fast rewind controller 140*b* will not be particularly effective for the user to return to the beginning of the currently presented song and/or to the beginning of a previously presented song using this fast rewind operation (or, if there is audio output during the fast forward operation, the audio output is generally unintelligible to the user).

Another example audio/visual media content event presentation operation is a jump forward operation. For example, a jump forward controller 140*c* (indicated by an upward pointing arrow) is intuitively understood by the user to correspond to a jump forward operation wherein presentation of the video portion is advanced by some predefined duration or increment when the associated controller 140*c* is actuated by the user. Similarly, the jump backward controller 140*d* (indicated by a downward pointing arrow) is intuitively understood by the user to correspond to a jump backward operation wherein presentation of the video portion is advanced by some predefined duration or increment when the controller 140*d* is actuated by the user. The amount of the forward jump or reverse jump may be based on a predefined duration (period of time).

Alternatively, or additionally, some audio/visual content will include triggers, markers, or the like that are used to index the jump forward or jump backward to a predefined point in the audio/visual content. For example, but not limited to, scene index triggers may be included in the audio/visual media content event at the end and/or beginning of key scenes. In response to actuation of the controller 140*c*, presentation of the video content immediately advances (jumps forward) to the indexed scene having the next scene index trigger (presuming that a sufficient amount of the audio/visual media content event has been previously stored in the program buffer 124 to support the requested jump forward operation).

During the jump forward and jump rewind operations, presentation of the audio content is discontinued. That is, because the video content is advanced or retarded by some predefined duration (or to a particular scene index trigger), the corresponding audio must be advanced or retarded by the same amount so that the presentation of the audio content remains synchronized with presentation of the video content.

When the user is listening to songs presented by an audio-only content channel, the jump forward controller 140*c* will not be particularly effective for the user to get through the currently presented song and to the beginning of the next song since the duration of the jump forward change is likely not the same as the remaining duration of the currently presented song. Accordingly, the end of the currently presented song may not be reached with a single jump forward operation, or alternatively, the beginning of the next song may be missed as the jump operation advances presentation by the predefined duration that exceeds the remaining duration of the currently presented song. Similarly, jump backward controller 140*d* will not be particularly effective for the user to return to the beginning of the currently presented song and/or to the beginning of the previously presented song with this jump backward operation since the duration of the jump backward change is likely not the same as the initial duration of the currently presented song.

Embodiments of the audio content presentation system 100 are configured to provide audio/visual content based control of the buffered string of songs so that the user may selective jump forward to the beginning of the next song (defined herein as the skip track forward operation), jump backward to the beginning of the currently presented song (defined herein as a return to song beginning operation), and/or jump further backward to the beginning of a previously presented song (defined herein as a skip track backward operation). These audio-only content type operations are provided by embodiments of the audio content presentation system 100 based upon a determination of whether the currently presented media content is audio-only content or is audio/visual content.

When an audio/visual content channel is currently selected for presentation, embodiments operate in accordance with well understood video presentation operations. For example, the fast forward controller 140*a* and the fast rewind controller 140*b* control fast forward and fast rewind presentation of the currently presented audio/visual media content event. The jump forward controller 140*c* and the jump backward controller 140*d* control incremental jumps in the presentation of the audio/visual media content event.

However, when an audio-only content channel is currently selected for presentation, embodiments operate in accordance with the audio presentation operations. That is, upon determination that songs from an audio-only content channel are being presented, operations for song presentation are enabled (such as the skip track forward operation that advances song presentation to the beginning of the next song in the program buffer 124, the return to song beginning operation the returns to the beginning of the currently presented song, and the skip track backward operation that returns presentation to the beginning of the previously presented song).

In a non-limiting example embodiment, the audio content presentation system 100 determines whether the media content of a current channel is audio/visual content or audio-only content based on the configuration of the current operation of the tuner 118*a*. Here, the processor system 120 controlling operation of the tuner 118*a* has already received the user specification for a particular channel. The identifying information associated with the user specified channel is used by the processor system 102, executing the audio control logic, to determine whether the current channel is an audio-only content channel or an audio/visual content channel.

In this example embodiment, the identifying information for audio-only content channels and/or for audio/visual content channels is stored in the channel identifier database 138. The channel identifier database 138 includes a listing of a plurality of channels available for access by the media device 102, and for each listed channel, includes information that identifies whether that associated channel is an audio-only content channel or an audio/visual content channel.

The identifying information of the currently presented channel that the tuner 118*a* is currently receiving is compared with the identifiers stored in the channel identifier database 138. When a match between the identifying information of the currently presented channel is found with one of the identifiers stored in the channel identifier database 138, the determination whether the media content of a current channel is audio/visual content or audio-only content based on the corresponding information for the matched channel.

Alternatively, or additionally, embodiments may determine whether the media content of a current channel is audio/visual content or audio-only content based on information in the received media content stream 116. In an example embodiment, the metadata of a stream of media content includes, at least periodically, information that identifies the channel. Once the information identifying the current channel is received in information residing in the media content stream 116, the channel identifier database 138 can be accessed as described above to determine whether the media content of the current channel is audio/visual content or audio-only content.

Alternatively, or additionally, embodiments may determine whether the media content of a current channel is audio/visual content or audio-only content based on characteristics of the media content stream. In an example embodiment, an absence of video content is interpreted as an indication that the currently presented channel is an audio-only content channel. Alternatively, or additionally, presence of relatively complex video data may be interpreted as an indication that the currently presented channel is an audio/visual content channel. Embodiments of the audio content presentation system 100 may analyze one or more characteristics of present video content. For example, video data having few moving edges, slow moving edges, and/or large durations of black screen data (or another colored background screen) may be interpreted as an indication that the currently presented channel is an audio-only content channel. Still images and/or very slow moving images in the video content may be interpreted as an indication that the currently presented channel is an audio-only content channel. Here, the processor system 120 may determine the number, speed, and/or direction of movement vectors and/or may determine other characteristics (such as black or colored screen data, or even identify one or more still images) of the video information.

Alternatively, or additionally, the video content may be comprised of a serially sequenced plurality of video frames that comprise different frame types, such as an I-frame (intra coded frame or slice), a P-frame (predicted frame of slice) and a B-frame bi-directional predicted frame or slice), that are compressible to different degrees. The I-frame is the least compressible but don't require other video frames to decode. The P-frame may use data from previous I-frames to decompress and are more compressible than an I-frame. The B-frame can use both previous and forward frames for data reference to get the highest amount of data compression. In contrast, any video content (if present) in audio-only type content may be different from the above described frames used in compression of audio/visual content. Thus, the determination of whether the media content of a current channel is audio/visual content or audio-only content may be based on one or more characteristics of the video data, if present.

Alternatively, or additionally, comparison between newly received I-frames, P-frames, and/or B-frames may be made with previously received I-frames, P-frames, and/or B-frames. If the frames are significantly changed from each other, this may be interpreted as an indication that the currently presented channel is an audio/visual content channel. In contrast, if the frames have not changed, or have not significantly changed from each other, this may be interpreted as an indication that the currently presented channel is an audio-only content channel.

Alternatively, or additionally, embodiments may evaluate the metadata that is included in the media content stream 116. Metadata or other control information for the songs received in an audio-only content stream is quite different from metadata for received audio/visual content. Metadata of audio-only content is typically limited to information such as the artist's name, the song title, the album name, the song label, the song recording date, etc. Further, while a song is being played, the metadata or other control information typically remains constant. That is, the artist's name, the song title, the album name, the song label, the song recording date, etc.) relating to the currently presented song remains the same until that song concludes. Such information in the metadata may be interpreted as an indication that the currently presented channel is an audio-only content channel. In contrast, metadata for audio/visual content may include information that is not typically related to a song. For example, the metadata of an audio/visual media content event may indicate a scene identifier, actor names, scene filming locations, etc. Thus, the contents of the metadata or other control information may be interpreted as an indication that the currently presented channel is an audio-only content channel.

Alternatively, or additionally, the user's navigation about a presented EPG menu 144 may be used to determine whether the media content of a current channel is audio/visual content or audio-only content. The user selects media content of interest via the presented EPG menu 144. When the user selects a particular channel, media content event, or the like using their remote control 106, the processor system must determine precisely which channel of media content event the user has intended to select so that the processor system 120 may properly operate the tuner 118*a* to access the correct channel that is providing the specified media content of interest. When the user makes a selection via the presented EPG menu 144, the processor system can compare the user-selected channel or media content event with the information in the channel identifier database 138 to determine whether the received media content of the current channel is audio/visual content or audio-only content.

Alternatively, or additionally, embodiments may determine whether the media content of a current channel is audio/visual content or audio-only content based on which of controllers 140 of the remote control 106 the user has recently actuated. For example, a channel up (increment) or channel down (decrement) operation initiated in response to user actuation of one of the controllers 140 may be used to determine whether the media content of a current channel is audio/visual content or audio-only content. For example, if the media device 102 is currently presenting Channel 101, and the user actuates the channel up actuator to change the channel to Channel 102, the identity of this new channel (here, Channel 102) is inherently determinable by the processor system 120 since information about the Channel 102 is stored in the channel identifier database 138.

In the various embodiments, any one or more of the above described means of determining whether the media content of a current channel is audio/visual content or audio-only content may be employed. In embodiments that employ multiple means making of a determination of whether the currently presented media content is audio-only content or is audio/visual content, such embodiments improve the reliability of making the correct determination, and subsequently automatically implementing either the audio/visual content control functions or the audio-only content control functions described herein.

When the current channel is determined to be providing audio-only content, one or more control functions of the media device 102 are modified to be more appropriate for management of song presentation. That is, embodiments of the audio content presentation system 100 automatically implement either the audio/visual content control functions or the audio-only content control functions described herein. For example, the example skip track forward operation, the return to song beginning operation, and/or skip track backward operation become enabled when audio-only content is identified. Alternatively, or additionally, the fast forward, fast rewind, jump forward, and/or jump backward operations are disabled (since the audio-only content does not include, or has minimal, video content) when audio-only content is identified. When the media device 102 later changes from the audio-only content channel to an audio/visual content channel, the song skip track forward and/or song skip track backward functions become disabled, and the fast forward, fast rewind, jump forward, and/or jump backward operations are then enabled.

After the current channel is determined to be providing audio-only content, the beginning of the next song must be identified and/or determined when the example skip track forward operation is received. Additionally, the beginning of the current song must be identified and/or determined when the return to song beginning operation is received. And, the beginning of the previously presented song must be identified and/or determined when the skip track backward operation is received.

The end of a currently played song, the beginning of a currently played song, and/or the beginning of the next song, may be identified and/or determined in a variety of manners by the various embodiments of the audio content presentation system 100. Alternatively, or additionally, transitions from the currently presented song to the next presented song may be identified and/or determined by embodiments of the audio content presentation system 100.

The beginning of a song, the end of a song, and/or a transition between songs may be determined based on an analysis of the metadata of the audio-only content. The audio-only content metadata identified, for each particular song in the audio-only content stream, information that is unique to that particular song. For example, the metadata may include the artist's name, the song title, the album name, the song label, the song recording date for each individual song. Embodiments of the audio content presentation system 100 monitor the stream of meta data and determine one or more of the artist's name, the song title, the album name, the song label, the song recording date of the currently played song. When the artist's name, the song title, the album name, the song label, the song recording date changes in the monitored metadata, the end of a currently played song is identified and/or determined. Alternatively, when the artist's name, the song title, the album name, the song label, the song recording date changes in the monitored metadata, the beginning of the next song may be identified and/or determined. Similarly, a change in the monitored metadata may be used to identify a transition between songs.

Other methods and/or information may be used to identify and/or determine the beginning of a song, the end of a song, and/or a transition between songs. For example, video information may graphically depict the artist's name, the song title, the album name, the song label, the song recording date of a currently played song, which is indicated using text in an image that is presented on the display 110. Text identification algorithms may be employed to determine text from the image data. Then, changes in the text may be used to identify and/or determine the beginning of a song, the end of a song, and/or a transition between songs.

If image information is present in the audio-only content, characteristics of the image may be analyzed to identify and/or determine the beginning of a song, the end of a song, and/or a transition between songs. For example, I-frames, P-frames, and/or B-frames may be analyzed as described herein. For example, if a single I-frame, or a plurality of substantially similar I-frames, are presenting a still image on the display 110 during the current song, and then a different still image becomes displayed when the next song is played, the a transition in I-frames of the current song to the I-frames of the next song can be used to identify the beginning of the next song, the end of the current song, and/or a transition between songs because the I-frames are substantially different.

Changes in background color of an image presented on the display 110 may be used to identify and/or determine the beginning of a song, the end of a song, and/or a transition between songs. Changes from a currently presented still image to a different still image may be used to identify and/or determine the beginning of a song, the end of a song, and/or a transition between songs.

The stream of audio-only content data may include embedded triggers, markers, or the like to signal the beginning of a song, the end of a song, and/or a transition between songs. When these triggers, markers, or the like are detected in the processed stream of audio-only content, the beginning of a song, the end of a song, and/or a transition between songs may be identified and/or determined.

The identification of the song beginning, song end, and or song transition is used to support the example skip track forward operation, the return to song beginning operation, and/or skip track backward operation. For example, when a skip track forward operation is received, the content of the program buffer 124 is accessed to identify or to determine the end of the currently played song. Then, the beginning of the next song may be accessed from the program buffer 124, and then streamed out to the components of the media content presentation system 104 so that the next song is presented from its beginning.

Alternatively, when the skip track forward operation is received, the content of the program buffer 124 is accessed to identify or to determine the beginning of the next song. Then, the beginning of the next song may be accessed from the program buffer 124, and then streamed out to the components of the media content presentation system 104 so that the next song is presented from its beginning.

When a return to song beginning operation is received, the content of the program buffer 124 is accessed to identify or to determine the beginning of the currently played song. Then, the beginning of the currently played song may be accessed from the program buffer 124, and then streamed out to the components of the media content presentation system 104 so that the song is presented from its beginning.

Alternatively, when a return to song beginning operation is received, the content of the program buffer 124 is accessed to identify or to determine the end of the previously played song. Then, the beginning of the currently played song may be accessed from the program buffer 124, and then streamed out to the components of the media content presentation system 104 so that the song is presented from its beginning.

When a skip track backward operation is received, the contents of the program buffer 124 is accessed to identify or to determine the beginning of the previously played song. Then, the beginning of the previous song may be accessed from the program buffer 124, and then streamed out to the components of the media content presentation system 104 so that the previous song is presented from its beginning.

In the various embodiments of the audio content presentation system 100, user control of presented audio/visual content and audio-only content is provided in the commands communicated from the remote control 106. The remote control 106 includes a plurality of different controllers 140 disposed on the surface of the remote control 106. The user, by actuating one or more of the controllers 140, causes the remote control 106 to generate and transmit commands, via a wireless signal 142, to the media device 102. In the various embodiments of the audio content presentation system 100, each individual one of the controllers 140 has a specific predefined function that causes a specific operation by the media device 102 and/or by components of the media content presentation system 104 based on whether the currently presented media content is audio/visual content or is audio-only content. That is, a single controller 140 may optionally have a particular predefined function when the currently presented media content is audio/visual content, and have a different particular predefined function when the currently presented media content is audio-only content.

For example, the fast forward controller 140a (indicated by right pointing double arrows) is intuitively understood by the user to correspond to a fast forward operation when audio/visual content is being presented. However, when audio-only content is being presented, the function of the fast forward controller 140a is changed to correspond to a skip track forward operation.

As another example, the fast rewind controller 140b (indicated by left pointing double arrows) is intuitively understood by the user to correspond to a fast rewind operation when audio/visual content is being presented. However, when audio-only content is being presented, the function of the fast rewind controller is changed to correspond to a skip track backward operation.

Alternatively, or additionally, the jump forward controller 140c (indicated by an upward pointing arrow) is intuitively understood by the user to correspond to a jump forward operation when audio/visual content is being presented. However, the jump forward controller 140c may be changed to correspond to a particular audio-only content control functions, such as the skip track forward operation.

Alternatively, or additionally, the jump backward controller 140d (indicated by a downward pointing arrow) is intuitively understood by the user to correspond to a jump backward operation when audio/visual content is being presented. However, the jump backward controller 140d may be changed to correspond to a skip track backward operation when audio-only content is being presented. Alternatively, the jump backward controller 140d may be changed to correspond to a return to song beginning operation when audio-only content is being presented.

Other controllers may have the same functionality regardless of whether audio/visual content or audio-only content is being presented. For example, the controller 140e (indicated by two parallel upward oriented bars) is intuitively understood by the user to correspond to a pause function. Accordingly, if the user actuates the controller 140e, presentation of the video and audio portion of audio/visual content is paused when audio/visual content is being presented. Similarly, if the user actuates the controller 140e, presentation of the currently presented song is paused when audio-only content is being presented.

In some embodiments, a selected controller 140 may be assigned a particular function when audio-only content is being presented. For example, the controller 140f may be assigned to the return to song beginning operation. Thus, when controller 140e is actuated by the user, presentation returns to the beginning of a currently played song.

In some embodiments, the change in functions of the controllers 140 may be an optional feature that is selectable by the user. A configuration menu or the like may be presented on the display 110 that permits the user to place the audio content presentation system 100 in a mode wherein functions of the controllers 140 are automatically changed depending on whether audio/visual content or audio-only content is currently be presented.

In some embodiments, intervening non-musical segments may be located between songs, such as an intervening advertisement, commentary from show hosts, a news report, or the like. The user may not wish to listen to such intervening non-musical segments. Accordingly, some embodiments of the audio content presentation system 100 may be optionally configured to automatically skip over the intervening non-musical segments when the user actuates one of the controllers 140. For example, when the user actuates the controller 140a to cause a skip track forward operation, the next song is played from its beginning. In the event that one or more intervening non-musical segments preceded the next song in the stream of buffered audio-only content, such intervening non-musical segments would be automatically skipped over and not played.

However, in some situations, the intervening non-musical segments may be of interest to the user. For example, the intervening non-musical segment may be interesting commentary information spoken by a show host or may be an interesting newscast segment. In an example embodiment, one of the controllers 140 may be configured to omit presentation of such intervening non-musical segments, and a different controller may be configured to present such intervening non-musical segments.

For example, the controller 140a may be assigned the skip track forward operation with permitted presentation of the intervening non-musical segments following the currently presented song. If the user actuates the controller 140a, the end portion of the currently presented song is skipped, and presentation of the audio-only content resumes after the end of the currently presented song (which will either be one of the intervening non-musical segments or the next song). On the other hand, the controller 140c may be assigned the skip track forward operation directly to the next song, wherein intervening non-musical segments are also automatically skipped over. Thus, actuation of the controller 140c automatically skips over the end of the end portion of the currently presented song and any intervening non-musical segments, and resumes at the beginning of the next song.

As another non-limiting example, the controller 140b may be assigned the skip track backward operation with permitted presentation of the intervening non-musical segments following the currently presented song. If the user actuates the controller 140b, play back begins at the beginning of the previously played song, or at the beginning of any intervening non-musical segments if present in the buffered audio-only content. On the other hand, the controller 140d may be assigned the skip track forward operation directly to the previously played song, wherein intervening non-musical segments are also automatically skipped over.

In some embodiments, metadata or other control information may be provided to the media device 102 using different formats or media. For example, the metadata for an audio-only content channel may be communicated similar to, or even with, communicated EPG information. Timing information in such metadata may be used to identify and/or determine the beginning of a song, the ending of a song, and/or transitions between songs. Such separately provided metadata may be stored in the EPG information 134 portion of memory 122, or may be separately stored as a table or the like in the memory 122 or other suitable memory medium.

In some embodiments, information that uniquely differentiates audio-only content from audio/visual content may be used to make a determination of whether the currently presented media content is audio-only content or is audio/visual content. For example, a database or the like comprising a list of music recording artists and/or song titles may be separately compiled. Information in the received media content stream may be monitored to determine if one or more of the music recorded artists and/or titles are identified in the database. If the media content includes information, such as in the received metadata, corresponding to the stored listing of music recording artists and/or titles, then the received media content stream may be determined to be audio-only content. Such lists may be stored as part of the channel ID database 138 or may be stored separately in another suitable database and/or memory medium.

Some embodiments are configured to automatically skip over intervening non-musical segments. In such an example embodiment, the metadata could be monitored. For example, the metadata information may be compared to the database with information pertaining to songs. If the monitored metadata does not include information related to a known song, then the embodiment can assume that an intervening non-musical segment has been identified, and then may be skipped over.

In alternative embodiments, the processed stream of audio-only content may be stored in another medium, such as the example DVR 126. When songs from the previously stored audio-only content are retrieved and presented from the DVR 126 or the like, embodiments of the audio content presentation system 100 may similarly implement audio-only control functions as described herein.

Figure 3:
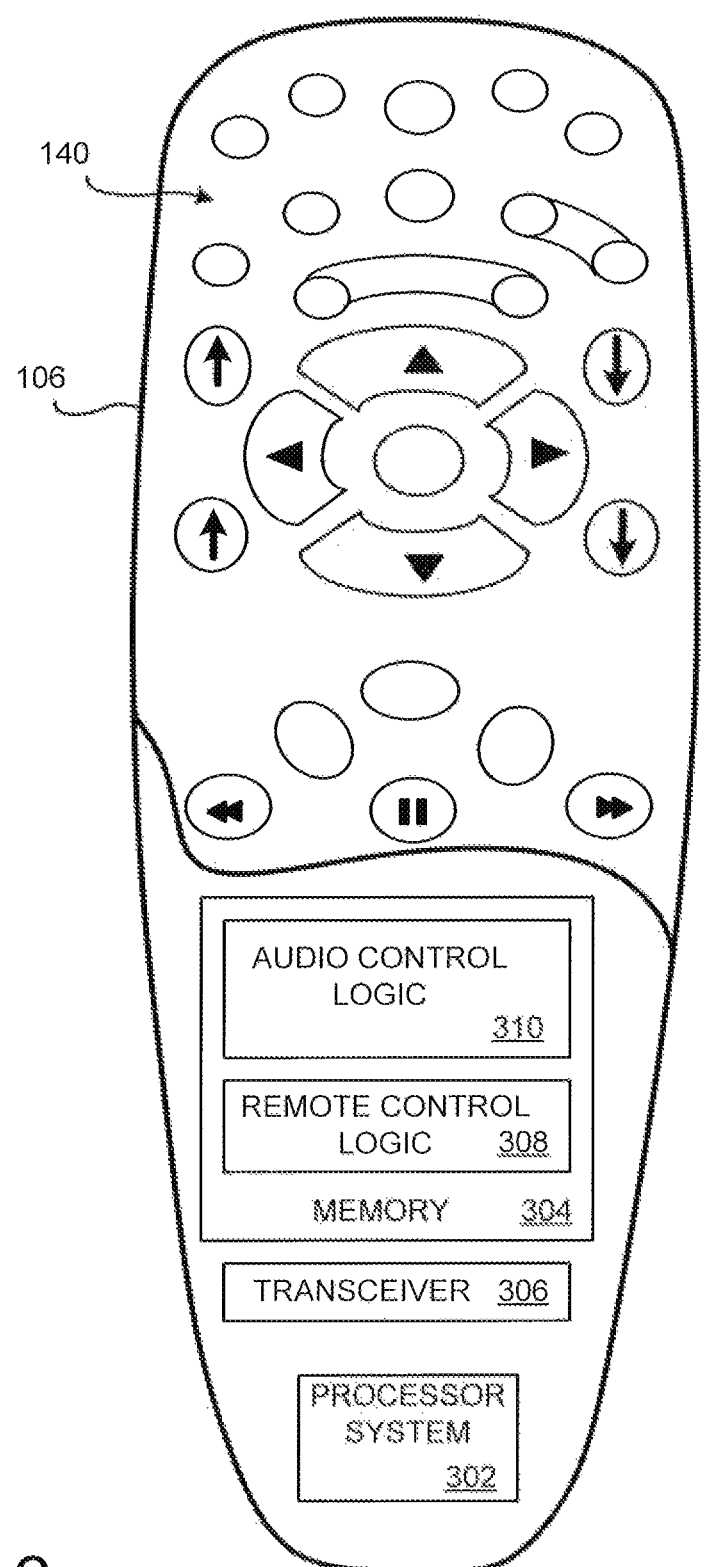
FIG. 3 is a block diagram of an embodiment of the audio content presentation system implemented in a remote control.

FIG. 3 is a block diagram of an embodiment of the audio content presentation system 100 implemented in a remote control 106. The remote control 106 comprises a processor system 302, a memory 304, the microphone 232, and the transceiver 306. The memory 304 comprises portions for storing the remote control logic 308 and the audio control logic 310. In some embodiments, the remote control logic 308 and the audio control logic 310 may be integrated together, and/or may be integrated with other logic. In other embodiments, some or all of these memory and other data manipulation functions may be provided by and using remote server or other electronic devices suitably connected via the Internet or otherwise to a client device. Other remote controls 106 may include some, or may omit some, of the above-described media processing components. Further, additional components not described herein may be included in alternative embodiments.

The remote control logic 308 manages processing of user inputs received by one or more of the controllers 104, and manages generation and communication of associated control information based on whether the currently presented media content is audio-only content or is audio/visual content. The control information is communicated in the wireless signal 142 (FIG. 1) emitted by the transceiver 306. The control information can be specifically encoded with particular control commands based on a determination of whether the currently presented media content is audio-only content or is audio/visual content.

An example embodiment of the remote control 106 may be configured as a universal type of remote control device that may operate a legacy media device 102 and/or legacy components of the media content presentation system 104. When audio/visual content is determined and/or identified at the remote control 106, then audio/visual content specific commands can be directly issued by the remote control 106. When audio-only content is determined and/or identified, then audio-only content specific commands may be directly issued by the remote control 106.

In some embodiments, the remote control may include a display 110 or the like wherein the EPG menu 144 is presented. As the user navigates about the presented EPG menu 144 using the remote control 106, the remote control can make the a determination of whether the currently presented media content is audio-only content or is audio/visual content.

In some situations, the user may directly specify a channel by actuating a series of controllers that are associated with numerals. For example, the user may actuate the controllers associated with the numerals 1, 2, and 3, thereby specifying that the media device 102 tune to "Channel 123" and then present that media content currently being broadcast by that particular channel. The processor system 302 can compare the specified channel identifier with the channel identifiers in the channel identifier database 138, which may be stored locally in the remote control 106 and/or which may be stored remotely from the remote control 106. When a channel match is found, the remote control 106 can make the determination of whether the currently presented media content is audio-only content or is audio/visual content.

It should be emphasized that the above-described embodiments of the audio content presentation system 100 are merely possible examples of implementations of the invention. Many variations and modifications may be made to the above-described embodiments. All such modifications and variations are intended to be included herein within the scope of this disclosure and protected by the following claims.

The invention claimed is:

1. A system for presentation control of media content, the system comprising:
    a tuner configured to receive a media content stream containing the media content;
    one or more processors; and
    one or more memory devices having stored thereon instructions that when executed by the one or more processors cause the one or more processors to:
        communicate the media content to a media presentation device;

analyze the currently presenting media content to identify whether the media content is audio/visual content or audio-only content;
receive a command from a remote control;
in response to receiving the command, perform a skip track forward operation that skips presentation from a currently presenting song to the beginning of a next song when the media content is identified as audio-only content; and
in response to receiving the command, perform a fast forward operation that presents the media content at a faster than normal speed when the media content is identified as audio/visual content.

2. The system of claim 1, further comprising instructions to store the received media content in a program buffer and communicate the media content stored in the program buffer to the media presentation device.

3. The system of claim 1, wherein analyzing the currently presenting media content to identify whether the media content is audio/visual content or audio-only content comprises analyzing at least one of the currently presenting media content and electronic program guide (EPG) information to identify one of a first characteristic and a second characteristic of the currently presenting media content, wherein the first characteristic is associated with audio/visual content and the second characteristic is associated with audio-only content, and determining, based on the identified one of the first characteristic and the second characteristic, whether the currently presenting media content provides audio/visual content or provides audio-only content, wherein the audio-only content comprises a series of a plurality of songs and limited visual content in the received media content.

4. The system of claim 3, wherein determining whether the currently presenting media content provides audio/visual content or provides audio-only content comprises:
accessing electronic program guide information that has been stored on a memory of the media device,
wherein the EPG information includes a list of channels that are accessible by the media device, and
wherein for each one of the channels listed in the EPG information, each channel includes a descriptor that describes the media content that is currently in the stream of media content of that particular channel; and
analyzing the descriptor of a currently presenting channel listed in the EPG information to determine whether the currently received channel provides audio/visual content or provides audio-only content,
wherein the audio/visual content is determined when the descriptor corresponds to the first characteristic that is associated with audio/visual type media content, and
wherein the audio-only content is determined when the descriptor corresponds to the second characteristic that is associated with audio-only type media content.

5. The system of claim 1, further comprising instructions to determine at least one of a beginning and an end for each of a plurality of songs based on metadata provided with the songs when the media device has determined that the currently presenting media content provides audio-only content.

6. The system of claim 5, wherein the metadata provided with each song includes at least one of an artist's name, a song title, an album name, a song label, and a recording date, and wherein determining at least one of a beginning and an end for each of the plurality of songs comprises monitoring the metadata for changes to the at least one of an artist's name, a song title, an album name, a song label, and a recording date.

7. The system of claim 1, further comprising instructions to:
receive a second command from the remote control;
in response to receiving the second command, perform a skip track backward operation that skips presentation from a currently presenting song to the beginning of a previously received song when the media content is identified as audio-only content; and
in response to receiving the second command, perform a fast rewind operation that presents the media content in reverse at a faster than normal speed when the media content is identified as audio/visual content.

8. A method for presentation control of media content, the method comprising:
receiving a media content stream containing the media content;
communicating the media content to a media presentation device;
analyzing the currently presenting media content to identify whether the media content is audio/visual content or audio-only content;
receiving a command from a remote control;
in response to receiving the command, performing a skip track forward operation that skips presentation from a currently presenting song to the beginning of a next song when the media content is identified as audio-only content; and
in response to receiving the command, performing a fast forward operation that presents the media content at a faster than normal speed when the media content is identified as audio/visual content.

9. The method of claim 8, further comprising storing the received media content in a program buffer and communicating the media content stored in the program buffer to the media presentation device.

10. The method of claim 8, wherein analyzing the currently presenting media content to identify whether the media content is audio/visual content or audio-only content comprises analyzing at least one of the currently presenting media content and electronic program guide (EPG) information to identify one of a first characteristic and a second characteristic of the currently presenting media content, wherein the first characteristic is associated with audio/visual content and the second characteristic is associated with audio-only content, and determining, based on the identified one of the first characteristic and the second characteristic, whether the currently presenting media content provides audio/visual content or provides audio-only content, wherein the audio-only content comprises a series of a plurality of songs and limited visual content in the received media content.

11. The method of claim 10, wherein determining whether the currently presenting media content provides audio/visual content or provides audio-only content comprises:
accessing electronic program guide information that has been stored on a memory of the media device,
wherein the EPG information includes a list of channels that are accessible by the media device, and
wherein for each one of the channels listed in the EPG information, each channel includes a descriptor that describes the media content that is currently in the stream of media content of that particular channel; and analyzing the descriptor of a currently presenting channel listed in the EPG information to determine whether the currently received channel provides audio/visual content or provides audio-only content, wherein the audio/visual content is determined when the descriptor corresponds to the first characteristic that is associated with audio/visual type media content, and wherein the audio-only content is determined when the descriptor corresponds to the second characteristic that is associated with audio-only type media content.

12. The method of claim 8, further comprising determining at least one of a beginning and an end for each of a plurality of songs based on metadata provided with the songs when the media device has determined that the currently presenting media content provides audio-only content.

13. The method of claim 12, wherein the metadata provided with each song includes at least one of an artist's name, a song title, an album name, a song label, and a recording date, and wherein determining at least one of a beginning and an end for each of the plurality of songs comprises monitoring the metadata for changes to the at least one of an artist's name, a song title, an album name, a song label, and a recording date.

14. The method of claim 8, further comprising:

receiving a second command from the remote control;

in response to receiving the second command, performing a skip track backward operation that skips presentation from a currently presenting song to the beginning of a previously received song when the media content is identified as audio-only content; and in response to receiving the second command, performing a fast rewind operation that presents the media content in reverse at a faster than normal speed when the media content is identified as audio/visual content.

* * * * *